(12) United States Patent
Lee et al.

(10) Patent No.: US 12,354,775 B2
(45) Date of Patent: Jul. 8, 2025

(54) OVER-CURRENT PROTECTION DEVICE

(71) Applicant: Polytronics Technology Corp., Hsinchu (TW)

(72) Inventors: Chia-Yuan Lee, Hsinchu (TW); Cheng-Yu Tung, Tainan (TW); Hsiu-Che Yen, Taoyuan (TW); Chen-Nan Liu, Pitou Township, Changhua County (TW); Yung-Hsien Chang, Douliu (TW); Yao-Te Chang, Linnei Township, Yunlin County (TW); Fu-Hua Chu, Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 373 days.

(21) Appl. No.: 18/159,488

(22) Filed: Jan. 25, 2023

(65) Prior Publication Data

US 2024/0127989 A1    Apr. 18, 2024

(30) Foreign Application Priority Data

Oct. 17, 2022    (TW) .................... 111139211

(51) Int. Cl.
*H01C 7/02*    (2006.01)
*H01C 7/00*    (2006.01)

(52) U.S. Cl.
CPC ............ *H01C 7/028* (2013.01); *H01C 7/006* (2013.01); *H01C 7/021* (2013.01)

(58) Field of Classification Search
CPC ......... H01C 7/028; H01C 7/006; H01C 7/021
See application file for complete search history.

(56) References Cited

U.S. PATENT DOCUMENTS

| 2019/0306970 A1 | 10/2019 | Yang et al. | |
| 2024/0127988 A1* | 4/2024 | Yen .................... | H01C 7/027 |

FOREIGN PATENT DOCUMENTS

| CN | 101162632 | * | 4/2008 | |
| CN | 101162632 A | | 4/2008 | |
| CN | 109741891 A | | 5/2019 | |
| CN | 112210176 | * | 1/2021 | ............. C08J 3/246 |
| KR | 102253983 | * | 5/2021 | |

OTHER PUBLICATIONS

CN-101162632 translation (Year: 2008).*
CN-112210176 translation (Year: 2021).*
KR-102253983 translation (Year: 2021).*

* cited by examiner

*Primary Examiner* — Kyung S Lee
(74) *Attorney, Agent, or Firm* — MUNCY, GEISSLER, OLDS & LOWE, P.C.

(57) ABSTRACT

An over-current protection device includes a first metal layer, a second metal layer and a heat-sensitive layer laminated therebetween. The heat-sensitive layer exhibits a positive temperature coefficient (PTC) characteristic and includes a first polymer and a conductive filler. The first polymer consists of polyvinylidene difluoride (PVDF), and PVDF exists in different phases such as α-PVDF, β-PVDF and γ-PVDF. The total amount of α-PVDF, β-PVDF and γ-PVDF is calculated as 100%, and the amount of γ-PVDF accounts for 33% to 42%.

14 Claims, 3 Drawing Sheets

OVER-CURRENT PROTECTION DEVICE

BACKGROUND OF THE INVENTION

(1) Field of the Invention

The present application relates to an over-current protection device, and more specifically, to an over-current protection device having thermal stability and excellent voltage endurance capability.

(2) Description of the Related Art

Because the electrical resistance of conductive composite materials having a positive temperature coefficient (PTC) characteristic is very sensitive to temperature variation, they can be used as the material for current sensing devices and have been widely applied to over-current protection devices or circuit devices. More specifically, the electrical resistance of the PTC conductive composite material remains extremely low at normal temperatures, so that the circuit or cell can operate normally. However, when an over-current or an over-temperature situation occurs in the circuit or cell, the electrical resistance will instantaneously increase to a high electrical resistance state (e.g., at least above $10^4 \Omega$), which is the so-called "trip". Therefore, the over-current will be eliminated so as to protect the cell or the circuit device.

The basic structure of the over-current protection device consists of a PTC material layer with two electrodes placed on the two opposite sides of the PTC material layer. The PTC material is composed of a matrix and a conductive filler. The matrix generally consists of one or more polymers, and the conductive filler is uniformly dispersed in the matrix and is used as an electrically conductive path. Recently, the over-current protection device may include a polymer with high melting point, such as a polyvinylidene difluoride (PVDF), as the matrix for application at high temperature condition, and the conductive filler may be carbon black. However, additional additives are conventionally added in order to further improve the voltage endurance capability of the over-current protection device at high temperature condition. The additional additives usually make the formulation design complicated. For example, compatibility between the additional additives, polymers, and the conductive filler must be taken into consideration; after considering the compatibility and deciding desirable additives, the proportion between the polymers and the conductive filler needs to be adjusted properly in order to maintain excellent electric characteristics. In the time of fast-changing technologies, the formulation is frequently improved on the prior basis. The more compounds the formulation has, the more complex the formulation design is.

PVDF possesses many physical/chemical properties, but it still needs breakthroughs to improve voltage endurance capability. For example, the main crystalline phases of PVDF are α phase, β phase, and γ phase, and PVDF in these three phases may be referred to as α-PVDF, β-PVDF, and γ-PVDF, respectively. Regarding the three crystalline phases of PVDF, the application conventionally focuses on piezoelectricity or ferroelectricity of β-PVDF, but functionality of α-PVDF and γ-PVDF has not been sufficiently investigated, not to mention their applications in improvement of voltage endurance capability.

Accordingly, there are needs to improve voltage endurance capability of the over-current protection devices at high temperature.

SUMMARY OF THE INVENTION

The present invention provides a thin-type over-current protection device which can be applied at high temperature and has excellent voltage endurance capability. The present invention selects polyvinylidene difluoride (PVDF) as a matrix with high melting point, and further adjusts the proportion among crystalline phases existing in PVDF to enhance voltage endurance capability while operating at high temperature. In addition, the over-current protection device may recover back to low electrical resistance after tripping many times under high temperature. In this way, thermal stability and voltage endurance capability of the over-current protection device can be improved without help of additional additives.

In accordance with an aspect of the present invention, an over-current protection device includes a first metal layer, a second metal layer, and a heat-sensitive layer laminated between the first metal layer and the second metal layer. The heat-sensitive layer exhibits a positive temperature coefficient (PTC) characteristic. It has a first polymer and a conductive filler. The first polymer consists of polyvinylidene difluoride (PVDF), and PVDF has a plurality of crystalline phases including α-PVDF, β-PVDF and γ-PVDF. The total amount of α-PVDF, β-PVDF and γ-PVDF is calculated as 100%, and the amount of γ-PVDF accounts for 33% to 42%. The conductive filler consists of carbon black and is dispersed in the first polymer, thereby forming an electrically conductive path in the heat-sensitive layer.

In an embodiment, the amount of β-PVDF accounts for 9% to 21%.

In an embodiment, the combined amount of γ-PVDF and β-PVDF accounts for 54% to 62%.

In an embodiment, a percentage value by dividing the amount of β-PVDF by the combined amount of α-PVDF and γ-PVDF ranges from 15% to 27%.

In an embodiment, the volume of the heat-sensitive layer is calculated as 100%, and the first polymer accounts for 50% to 65% by volume.

In an embodiment, the heat-sensitive layer further includes a second polymer, and the conductive filler is dispersed in the first polymer and the second polymer. The second polymer is a fluoropolymer selected from the group consisting of polytetrafluoroethylene, ethylene-tetrafluoroethylene copolymer, tetrafluoroethylene-hexafluoro-propylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

In an embodiment, the second polymer is polytetrafluoroethylene.

In an embodiment, the volume of the heat-sensitive layer is calculated as 100%, and the second polymer accounts for 4% to 5% by volume.

In an embodiment, the heat-sensitive layer further includes a flame retardant selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide, and any combination thereof, wherein the volume of the heat-sensitive layer is calculated as 100%, and the flame retardant accounts for 3.2% by volume.

In an embodiment, the over-current protection device has a thickness and a first electrical characteristic. The thickness ranges from 0.2 mm to 0.4 mm, and the first electrical characteristic is a voltage-endurance value ranging from 36V to 60V.

In an embodiment, the over-current protection device has a second electrical characteristic, and the second electrical characteristic is a ratio resistance jump ranging from 1.2 to 2.2.

In an embodiment, the over-current protection device has a third electrical characteristic, and the third electrical characteristic is a trip temperature ranging from 160° C. to 170° C.

In an embodiment, the over-current protection device has an electrical resistivity ranging from 0.7 Ω·cm to 0.76 Ω·cm.

In an embodiment, the over-current protection device has a top-view area ranging from 30 $mm^2$ to 72 $mm^2$, and an endurable power per unit area ranges from 4.6 $W/mm^2$ to 4.75 $W/mm^2$.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
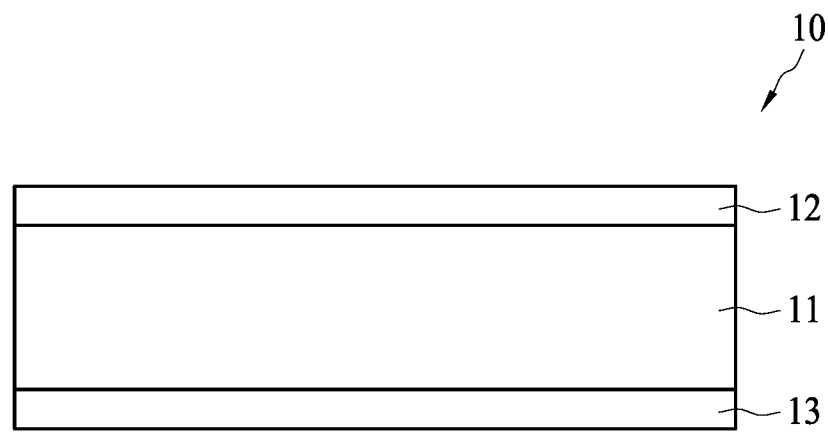
FIG. 1 shows a cross-sectional view of an over-current protection device in accordance with an embodiment of the present invention.

Please refer to FIG. 1. FIG. 1 shows one basic aspect of an over-current protection device of the present invention in cross-sectional view. The over-current protection device 10 includes a first metal layer 12, a second metal layer 13, and a heat-sensitive layer 11 laminated between the first metal layer 12 and the second metal layer 13. In an embodiment, the first metal layer 12 and the second metal layer 13 may be composed of the nickel-plated copper foils or other conductive metals. The heat-sensitive layer 11 exhibits a positive temperature coefficient (PTC) characteristic, and includes a first polymer and a conductive filler. The first polymer functions as a polymer matrix of the heat-sensitive layer 11, and the conductive filler consists of carbon black and is dispersed in such polymer matrix, thereby forming an electrically conductive path in the heat-sensitive layer 11. Therefore, in the present invention, the heat-sensitive layer 11 is a PTC material layer exhibiting PTC characteristic.

The volume of the heat-sensitive layer is calculated as 100%, and the first polymer accounts for 50% to 65% by volume. The first polymer consists of polyvinylidene difluoride (PVDF). In addition, PVDF has many crystalline phases, and the present invention further adjusts the proportion among crystalline phases (i.e., α-phase, β-phase, and γ-phase) existing in PVDF. PVDF in these three phases may be referred to as α-PVDF, β-PVDF, and γ-PVDF, respectively. Each phase of PVDF is determined by its stereo configuration, that is, polymer chains of each phase have an arrangement of trans (T) and gauche (G) different from each other. α-PVDF is characterized by TGTG conformation, and it is the most stable nonpolar structure; β-PVDF is characterized by TTTT conformation, which is a polar structure; and γ-PVDF is characterized by TTTGTTTG conformation, which is a polar structure. The present invention performs an irradiation treatment on PVDF through electron beam, and the dose of irradiation is properly adjusted (20 kGy to 1000 kGy) to obtain different PVDF with different proportion of the crystalline phases. After irradiation, the amount of α-PVDF, the amount of β-PVDF, and the amount of γ-PVDF are analyzed by X-ray Diffractometer (XRD).

In the present invention, the amount of α-PVDF, the amount of β-PVDF, and/or the amount of γ-PVDF would influence electrical characteristics of the over-current protection device 10. For example, γ-PVDF may function as an index for improvement in thermal stability and voltage endurance capability of the over-current protection device 10. The total amount of α-PVDF, β-PVDF and γ-PVDF is calculated as 100%, and the over-current protection device 10 has excellent thermal stability and voltage endurance capability if the amount of γ-PVDF accounts for 33% to 42%. If the amount of γ-PVDF is lower than 33%, the issue of non-uniform dispersion of the conductive filler in the heat-sensitive layer 11 arises, which makes the conductive filler aggregate non-uniformly. More specifically, γ-PVDF is unstable compared with α-PVDF, and therefore the crystalline size of γ-PVDF is usually small during crystallization. Compared with large-sized crystalline structure, small-sized crystalline structure has a smaller unit of volume, and thus can be uniformly dispersed in space. Accordingly, crystals of γ-PVDF can be uniformly dispersed in the entire PVDF, by which the conductive filler therebetween may be uniformly dispersed in the amorphous region. However, if the amount of γ-PVDF is too low (e.g., lower than 33%), the conductive filler cannot be uniformly dispersed and would aggregate so that the over-current protection device 10 is easily burnout under high voltage and has poor thermal stability. In addition, the electrical characteristics of the over-current protection device 10 are not determined by a single crystalline phase as described above. Under the circumstance that the amount of α-PVDF maintains in a specific range, if the amount of γ-PVDF is excessively higher (e.g., higher than 42%), the amount of β-PVDF would be adjusted too low relatively and resistance jump (defined and explained hereinafter) of the over-current protection device 10 is influenced. Moreover, inventors of the present invention find that the combined amount of β-PVDF and γ-PVDF can improve the electrical characteristics of the over-current protection device 10 when adjusted in a certain range. For example, the total amount of α-PVDF, β-PVDF and γ-PVDF is calculated as 100%, and the combined amount of γ-PVDF and β-PVDF accounts for 54% to 62% in the present invention. If the combined amount of γ-PVDF and β-PVDF ranges from 54% to 62%, the over-current protection device 10 can pass a cycle life test under 3000 cycles and maintain a great performance on the ratio of resistance jump. Furthermore, the ratio of resistance jump becomes more satisfied along with increase of the combined amount in the above range. In conclusion, excessive amount of γ-PVDF may cause insufficient amount of β-PVDF, and the combined amount thereof in the specific range may have excellent electrical characteristics. The present invention would be further improved if both situations are considered. Accordingly, in an embodiment, the amount of β-PVDF accounts for at least 9%, and the combined amount of γ-PVDF and β-PVDF accounts for 33% to 62%, such as 33%, 40%, 47%, 54%, or 62%. In a preferred embodiment, the amount of β-PVDF accounts for 13% to 21%, and the combined amount of γ-PVDF and β-PVDF accounts for 54% to 62%, such as 54%, 56%, 58%, 60%, or 62%. In another preferred embodiment, the amount of β-PVDF accounts for 20% to 21%, and the combined amount of γ-PVDF and β-PVDF accounts for 59% to 60%.

It is understood that β-PVDF has the best piezoelectric property among these three crystalline phases. Moreover, inventors of the present invention find that β-PVDF may also significantly influence stability of electrical resistance and voltage endurance capability when the amount of β-PVDF is adjusted in a specific range, that is, from 9% to 21%. The improvement is particularly pronounced as the amount of β-PVDF is adjusted relative to the amount of the other two crystalline phases. For example, the amount of β-PVDF is referred to as a first value, and the combined amount of α-PVDF and γ-PVDF is referred to as a second value. According to the present invention, the first value is divided by the second value to give a third value, and the third value is converted and expressed in a percentage (referred to as a percentage value hereinafter) ranging from 10% to 27%. If the percentage value ranges from 10% to 27%, the over-current protection device 10 can pass the cycle life test under 2000 cycles and 3000 cycles. In a preferred embodiment, the percentage value described above is adjusted in the range from 15% to 27% in order to further improve the issue of resistance jump. In another preferred embodiment, the percentage value is adjusted in the range from 26% to 27% so that the over-current protection device 10 can pass the cycle life test under 2000 cycles and 3000 cycles, and have the best ratio of resistance jump.

The heat-sensitive layer 11 may further include a second polymer, and the second polymer functions as a part of the polymer matrix described above. The conductive filler is dispersed in the polymer matrix formed of the first polymer and the second polymer, thereby forming the electrically conductive path in the heat-sensitive layer 11. The second polymer may preferably be a fluoropolymer selected from the group consisting of polytetrafluoroethylene, ethylene-tetrafluoroethylene copolymer, tetrafluoroethylene-hexafluoro-propylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof. For example, the second polymer may be polytetrafluoroethylene (PTFE). In the present invention, PVDF is the major constituent of the polymer matrix, and PTFE is the minor constituent of the polymer matrix. That is, the amount of PVDF is higher than that of PTFE. The volume of the heat-sensitive layer 11 is calculated as 100%, and PTFE accounts for 4% to 5% by volume. In an embodiment, the volume of the heat-sensitive layer 11 is calculated as 100%, and PTFE accounts for 4%, 4.2%, 4.4%, 4.6%, 4.8%, or 5% by volume. The melting point of PTFE is higher than that of PVDF, and thus PTFE can fine-tune thermal stability of the polymer matrix. More specifically, the melting point of PVDF ranges from 170° C. to 178° C., and the melting point of PTFE ranges from 320° C. to 335° C. During the low-temperature process, PVDF melts but PTFE does not, if the process temperature (e.g., 250° C.) for manufacturing the over-current protection device 10 or the reflow temperature is higher than the melting point of PVDF but lower than the melting point of PTFE. In this way, particles of PTFE remain in the solid state, and are uniformly dispersed in the heat-sensitive layer 11, thereby forming nucleation sites for PVDF. It is favorable to recrystallization of PVDF. Moreover, deformation of PTFE is less severe under high temperature condition because of its high melting temperature, by which the structure of the heat-sensitive layer 11 is stabilized by PTFE and does not deform severely. Because of the advantages of recrystallization, prevention of deformation, or other favorable properties in connection to high melting point, PTFE can effectively increase the stability of electrical resistance and voltage endurance capability of the over-current protection device 10.

In order to enhance flame resistance of the over-current protection device 10, the heat-sensitive layer 11 further includes a flame retardant selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide, and any combination thereof. In an embodiment, the flame retardant is magnesium hydroxide; and the volume of the heat-sensitive layer is calculated as 100%, and the flame retardant accounts for 3.2% by volume. Magnesium hydroxide may not only serve as a flame retardant, but also function as a buffer filler for acid-base neutralization. The reason is that hydrofluoric acid can be generated upon degradation of PVDF under high temperature condition, and magnesium hydroxide could react with hydrofluoric acid by neutralization reaction, thereby preventing device corrosion and other hazards caused by hydrofluoric acid. That is, magnesium hydroxide can enhance flame resistance while functioning as the buffer filler, and hence it is suitable for application in the fluoropolymer matrix of the over-current protection device 10.

It is noted that the thickness of conventional over-current protection device would be adjusted in the range from 0.4 mm to 0.6 mm in order to obtain excellent voltage endurance capability. However, because of the improvement regarding adjustment of crystalline phases of PVDF, the over-current protection device 10 of the present invention can be made to have a thickness much less than that of conventional over-current protection device, especially down to 0.2 mm of thickness, and still has excellent electrical characteristics. More specifically, the over-current protection device 10 has a thickness ranging from 0.2 mm to 0.4 mm, and the over-current protection device 10 may have at least three excellent electrical characteristics (referred to as a first electrical characteristic, a second electrical characteristic, and a third electrical characteristic hereinafter) in the above range of thickness. The first electrical characteristic is a voltage-endurance value ranging from 36V to 60V. Conventionally, the proportion among crystalline phases is not properly adjusted. If the thickness is less than 0.4 mm, the conventional over-current protection device can only withstand the applied voltage up to 36V at most and is burnout under the voltage exceeding 36V. However, the over-current protection device 10 of the present invention can have the thickness made far less than 0.4 mm, and withstand a high applied voltage up to 60V without burnout. The second electrical characteristic is a ratio of resistance jump ranging from 1.2 to 5.6. The ratio of resistance jump can be an index for assessing the stability of electrical resistance of an over-current protection device. For example, the over-current protection device 10 has a first electrical resistance before the cycle life test under room temperature. After tripping of device with many cycles, the over-current protection device 10 has a second electrical resistance when cooled back to room temperature. A value obtained by dividing the second electrical resistance by the first electrical resistance is the ratio of resistance jump. The smaller the ratio of resistance jump is, the better the resistance recovery capability of the over-current protection device 10 will be. In a preferred embodiment, the ratio of resistance jump ranges from 1.2 to 2.2. That is, after 2000 cycles or 3000 cycles of the cycle life test, the over-current protection device 10 is not burnout and still can recover from high electrical resistance to return to low electrical resistance, which may even be close to the initial state (e.g., 1.2 of the ratio of resistance jump). The third electrical characteristic is a trip temperature ranging from 160° C. to 170° C. After adjusting formulation of the heat-sensitive layer 11, the over-current protection device 10 may be tripped at about the melting temperature of PVDF, and would not have the issue of negative coefficient temperature (NTC) behavior, that is, the over-current protection device 10 can maintain a high electrical resistance during trip of device. In other words, after tripping, the high electrical resistance of the over-current protection device 10 would not gradually decrease with gradual elevation of temperature. The NTC behavior refers to a situation in which a high electrical resistance of the over-current protection device gradually decreases with gradual elevation of temperature, and it may cause the cut-off overcurrent to flow again owing to the gradual decrease in electrical resistance.

Figure 2:
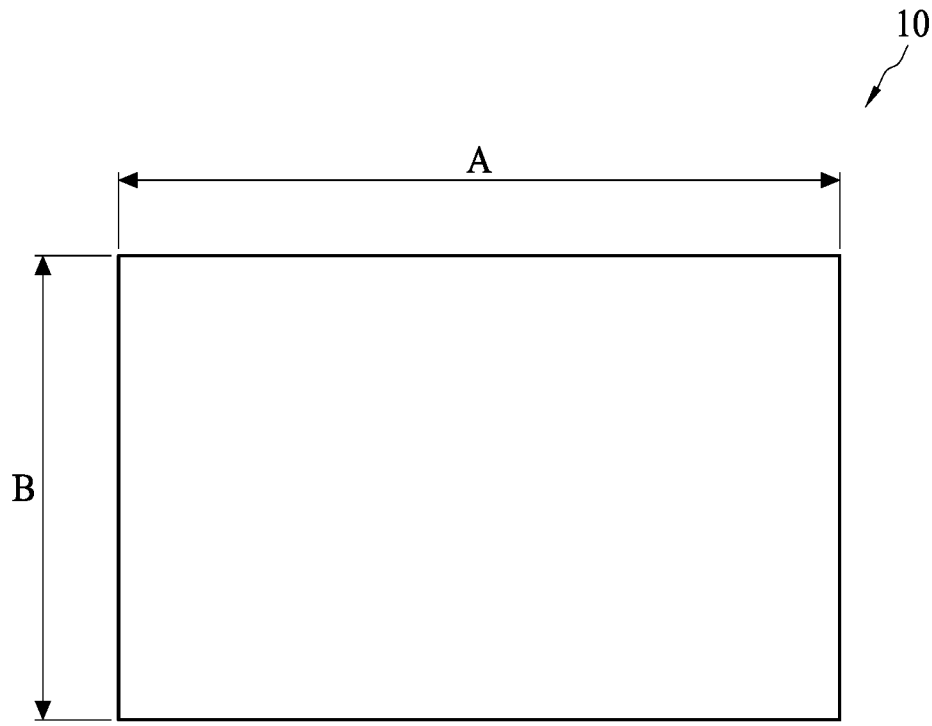
FIG. 2 shows the top view of the over-current protection device shown in FIG. 1.

Please refer to FIG. 2, it shows the top view of the over-current protection device 10 shown in FIG. 1. The over-current protection device 10 has a length A and a width B, and the top-view area "A×B" of the over-current protection device 10 is substantially equivalent to the top-view area of the heat-sensitive layer 11. The heat-sensitive layer 11 may have a top-view area ranging from 30 mm$^2$ to 72 mm$^2$ based on different products having different sizes. In some embodiments, the top-view area "A×B" may be 5×6 mm$^2$, 5.1×6.1 mm$^2$, 5×7 mm$^2$, 7.62×7.62 mm$^2$, 8.2×7.15 mm$^2$, 7.62×9.35 mm$^2$, or 8×9 mm$^2$. In addition, the over-current protection device 10 of the present invention can withstand higher power when compared with the conventional over-current protection device. Taking the size of 5×7 mm$^2$ as an example, the over-current protection device 10 has an endurable power per unit area ranging from 4.6 W/mm$^2$ to 4.75 W/mm$^2$. In contrast, the conventional over-current protection device can only withstand the applied voltage up to 36V at most, as described above, and therefore its endurable power per unit area is only 3 W/mm$^2$ at most.

As described above, the over-current protection device 10 of the present invention has the excellent electrical characteristics under high temperature. It could be verified according to the experimental data in Table 1 to Table 4 as shown below.

TABLE 1

| Volume percentage (vol %) of the heat-sensitive layer. | | | | |
|---|---|---|---|---|
| | PVDF | PTFE | Mg(OH)$_2$ | CB |
| heat-sensitive layer | 59 | 4.2 | 3.2 | 33.6 |

Table 1 shows the composition to form the heat-sensitive layer 11 by volume percentages. In the experiment, the heat-sensitive layer 11 is made of polyvinylidene difluoride (PVDF), polytetrafluoroethylene (PTFE), magnesium hydroxide (Mg(OH)$_2$), and carbon black (CB). PVDF and PTFE together form a polymer matrix of the heat-sensitive layer 11, and carbon black is dispersed in the polymer matrix and functions as a conductive path. Magnesium hydroxide is a flame retardant, and may also react with hydrofluoric acid (HF) generated upon degradation of PVDF. In order to increase voltage endurance and electrical characteristic stability of the device, the conductive filler only consists of carbon black, and any conductive ceramic material, metal material, metal carbide, or metal compound is not included therein. In other words, the composition of the present invention is aimed to the adjustment of physical/chemical properties of PVDF, and such adjustment is further verified when the conductive filler is under "CB system" (i.e., a system that the conductive filler consists of carbon black).

According to the composition shown in Table 1, materials are formulated and put into HAAKE™ twin screw blender for blending. The blending temperature is 215° C., the time for pre-mixing is 3 minutes, and the blending time is 15 minutes. The conductive polymer after being blended is pressed into a sheet by a hot press machine at a temperature of 210° C. and a pressure of 150 kg/cm$^2$. The sheet is then cut into pieces of about 20 cm×20 cm, and two nickel-plated copper foils are laminated to two sides of the sheet with the hot press machine at a temperature of 210° C. and a pressure of 150 kg/cm$^2$, by which a three-layered structure is formed. Then, the sheet with the nickel-plated copper foils is punched into PTC chips, each of which is the over-current protection device of the present invention.

Then, the PTC chips are irradiated, the microstructure of PVDF accounting for 59% is adjusted, and hence specific percentages of the crystalline phases are obtained. More specifically, PVDF is irradiated through a specific light source, and its microstructure can be changed due to the specific light source. The specific light source of irradiation is electron beam, and different doses to be tested are 20 kGy, 50 kGy, 200 kGy, 300 kGy, 600 kGy, and 1000 kGy, that is, doses to be tested are divided into six groups (would be fully discussed in Table 2). Groups E1 to E3 are high-dose groups referred to as embodiments E1, E2, and E3, the doses are 300 kGy, 600 kGy, and 1000 kGy, respectively. Groups C1 to C3 are low-dose groups referred to as comparative embodiments C1, C2, and C3, the doses are 20 kGy, 50 kGy, and 200 kGy, respectively.

Figure 3:
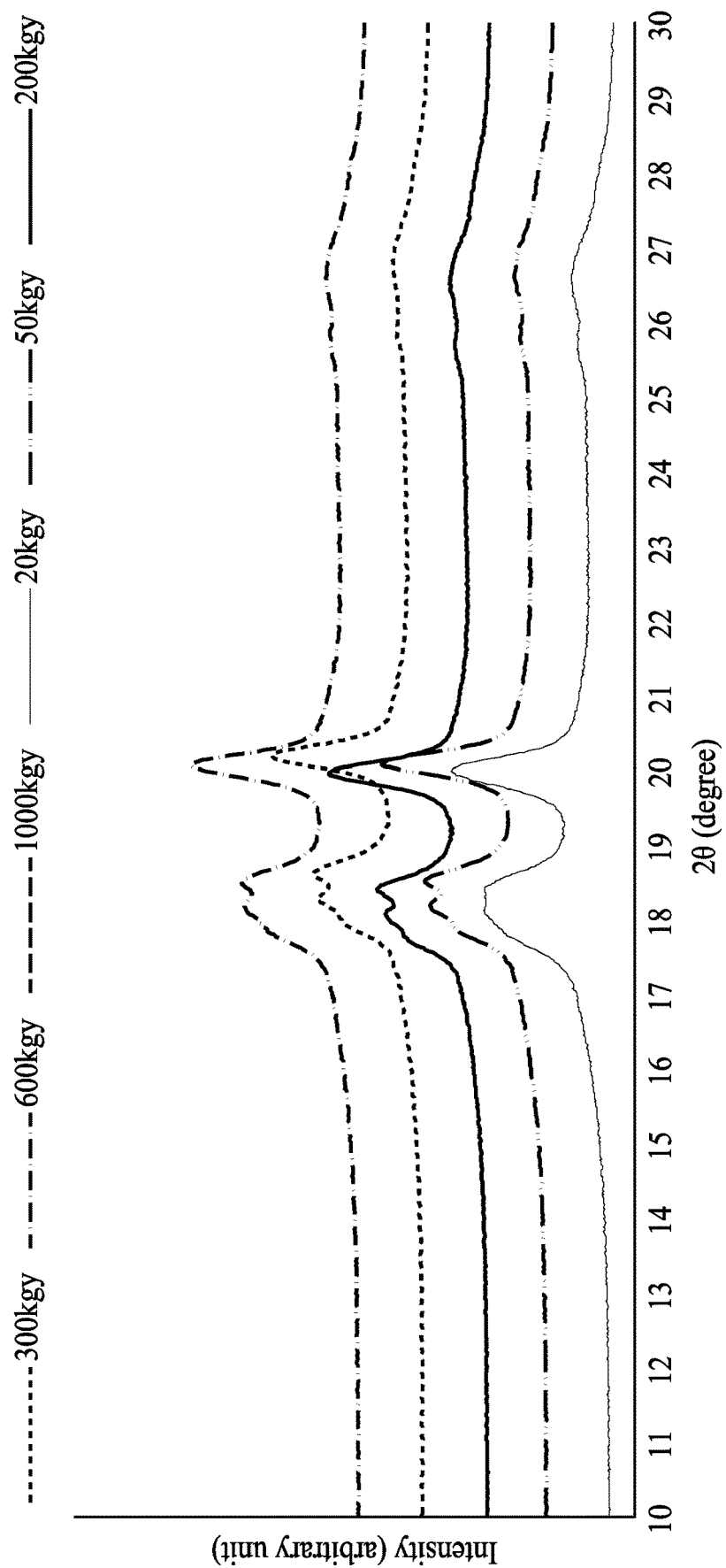
FIG. 3 shows XRD analysis of PVDF.

After irradiation, the crystal structure of PVDF can be analyzed through X-ray Diffractometer (XRD). The diffraction angles (2θ) of α-PVDF are 26.56°, 19.9°, 18.3°, and 17.6°; the diffraction angle (2θ) of β-PVDF is 20.26°; and the diffraction angles (2θ) of γ-PVDF are 20.02°, 19.2°, and 18.5°. After analyzing by XRD, counts per second (cps) of the diffraction angles of the groups can be obtained and converted to percentages as shown in Table 2. For comparison, results of XRD analysis for groups are normalized as shown in FIG. 3. In FIG. 3, the horizontal axis indicates the diffraction angle (2θ) represented by "degree (°)", and the vertical axis indicates the intensity represented by "arbitrary unit (a.u.)." It is observed that the XRD pattern of each group shows the peaks corresponding to α-PVDF, β-PVDF, and γ-PVDF.

TABLE 2

Proportion among the crystalline phases of PVDF.

| Group | α | β | γ | γ + β | β/(α + γ) |
|---|---|---|---|---|---|
| E1 | 40.83% | 20.74% | 38.43% | 59.17% | 26.17% |
| E2 | 44.48% | 13.23% | 42.29% | 55.52% | 15.24% |
| E3 | 56.60% | 9.80% | 33.61% | 43.40% | 10.86% |
| C1 | 51.50% | 6.28% | 42.22% | 48.50% | 6.70% |
| C2 | 46.63% | 6.98% | 46.38% | 53.37% | 7.51% |
| C3 | 51.40% | 6.87% | 41.73% | 48.60% | 7.38% |

Please refer to Table 2. Groups E1 to E3 are high-dose groups referred to as embodiments E1, E2, and E3, the doses are 300 kGy, 600 kGy, and 1000 kGy, respectively. Groups C1 to C3 are low-dose groups referred to as comparative embodiments C1, C2, and C3, the doses are 20 kGy, 50 kGy, and 200 kGy, respectively. The total amount (i.e., intensity as described above) of α-PVDF, β-PVDF, and γ-PVDF is calculated as 100% in each group, and different percentages of α-PVDF, β-PVDF, and γ-PVDF can be obtained. In the embodiments E1 to E3, the combined amount of γ-PVDF and β-PVDF is adjusted ranging from 43.40% to 59.17%, and the amount of β-PVDF is at least higher than 9.8%. It is noted that β-PVDF is well-known in its piezoelectric property as described above. Inventors of the present invention find that β-PVDF may also influence stability of electrical resistance and voltage endurance capability when the amount of β-PVDF is adjusted in a specific range. The improvement is particularly pronounced as the amount of β-PVDF is adjusted relative to the combined amount of the other two crystalline phases. Therefore, the ratio regarding the amount of β-PVDF relative to the combined amount of α-PVDF and γ-PVDF is also calculated and converted to percentage, as the β/(α+γ) shown in Table 2. As for the comparative embodiments C1 to C3, the combined amount of γ-PVDF and β-PVDF is adjusted ranging from 48.50% to 53.37%, and each comparative embodiment has the lower amount of β-PVDF around 6% to 7%.

Next, the over-current protection devices with different irradiated doses are analyzed by the following measurements, and each group is verified by five samples. Each sample of the over-current protection device has the length of 5 mm and the width of 7 mm (i.e., top-view area is 35 mm$^2$), and the thickness thereof is 0.22 mm.

TABLE 3

Cycle life test.

| Group | $R_i$ (Ω) | $\rho_i$ (Ω · cm) | $R_1$ (Ω) | $\rho_1$ (Ω · cm) | 2000 C | $R_{2000\,C}/R_1$ | 3000 C | $R_{3000\,C}/R_1$ |
|---|---|---|---|---|---|---|---|---|
| E1 | 0.047 | 0.751 | 0.071 | 1.124 | Pass | 1.25 | Pass | 1.51 |
| E2 | 0.046 | 0.737 | 0.077 | 1.225 | Pass | 1.85 | Pass | 2.18 |
| E3 | 0.044 | 0.706 | 0.082 | 1.311 | Pass | 4.96 | Pass | 5.56 |
| C1 | 0.051 | 0.815 | 0.059 | 0.942 | Fail | — | Fail | — |
| C2 | 0.050 | 0.800 | 0.059 | 0.940 | Fail | — | Fail | — |
| C3 | 0.050 | 0.789 | 0.068 | 1.077 | Fail | — | Fail | — |

In Table 3, the first row shows items to be tested from left to right.

"$R_i$" refers to initial electrical resistance of the over-current protection device at room temperature.

"$R_1$" refers to the electrical resistance in respect of the first time that the over-current protection device is tripped and cooled back to room temperature. More specifically, the lead may be further welded to the over-current protection device, and the welding temperature causes trip of device.

Moreover, the electrical resistance formula is ρ=R×A/L. "R" is electrical resistance, "L" is length (thickness), and "A" is cross sectional area. Accordingly, electrical resistivities of $\rho_i$ and $\rho_i$ can be calculated corresponding to $R_i$ and $R_1$.

"2000C" and "3000C" refer to test cycles of a cycle life test. One cycle of the cycle life includes applying voltage/current at 60V/20A for 10 seconds and turning it off for 60 seconds (i.e., on: 10 seconds; off: 60 seconds). It is observed whether the over-current protection device is burnout after 2000 cycles or 3000 cycles. "Pass" means that the over-current protection device is not burnout, and "Fail" means that the over-current protection device is burnout.

$R_{2000C}/R_1$ and $R_{3000C}/R_1$ refer to the ratios of resistance jump after 2000 cycles and 3000 cycles of the cycle life test. More specifically, after 2000 cycles or 3000 cycles, the electrical resistance $R_{2000C}$ (or $R_{3000C}$) of the over-current protection device can be measured when the over-current protection device is cooled back to room temperature. The value by dividing $R_{2000C}$ (or $R_{3000C}$) by $R_1$ is the ratio of resistance jump. The smaller the value (ratio of resistance jump) is, the better the resistance recovery capability of the over-current protection device will be. The over-current protection device with small ratio of resistance jump has better capability for electrical resistance recovery from trip of device toward the low electrical resistance. In other words, the ratio of resistance jump can be an index for assessing the stability of electrical resistance.

As mentioned previously, the amount of α-PVDF, the amount of β-PVDF, or the amount of γ-PVDF would influence the electrical characteristics of the over-current protection device 10, and the electrical characteristics of the over-current protection device 10 are not determined by a single crystalline phase. In embodiments E1 to E3, when the combined amount of γ-PVDF and β-PVDF accounts for 43.40% to 59.17% and the amount of β-PVDF accounts for higher than 9.80%, the over-current protection device has excellent voltage endurance capability and can pass either 2000 cycles or 3000 cycles of the cycle life test. Furthermore, the amount of γ-PVDF obviously influences the ratio of resistance jump under the circumstance above. When the amount of γ-PVDF is adjusted down to 33.61% (i.e., embodiment E3), the ratio of resistance jump is increased to 4.96-5.56 although the over-current protection device can pass the cycle life test. When the amount of γ-PVDF is adjusted up to 42.29% in the embodiment E2, the ratio of resistance jump is also increased to 1.85-2.18, as compared with the embodiment E1. Obviously, either the insufficient amount or the excessive amount of γ-PVDF would influence the electrical resistance stability of the over-current protection device. As for the comparative embodiments C1 to C3, all of them cannot pass the cycle life test, and the electrical resistance stability is also influenced by the amount of γ-PVDF. The amount of β-PVDF in the comparative embodiments C1 to C3 maintains in the range from 6% to 7%, and the electrical resistance $R_1$ is obviously increased when the amount of γ-PVDF is down to 41.73% (the lowest percentage among these three groups). It can be seen that differences of the electrical resistance stability among the test groups would emerge after tripping of device as discussed above. As for other adjustments in value or the range thereof, they are well discussed in the previous context and are not described in detail herein.

Figure 4:
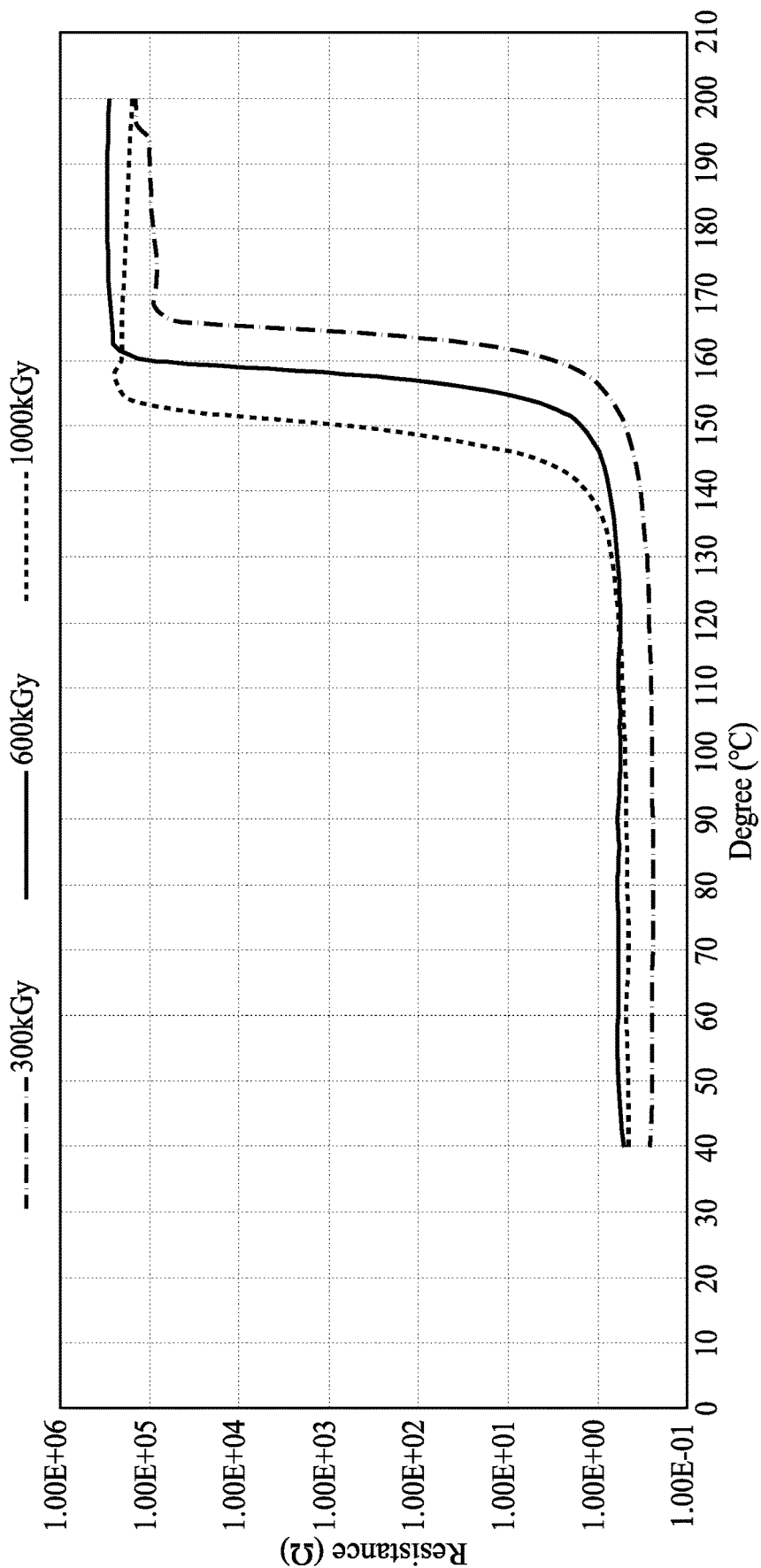
FIG. 4 shows resistance-temperature curves in accordance with the over-current protection device shown in FIG. 1.

According to the above, the over-current protection device would have excellent voltage endurance capability if the crystalline phases of PVDF are adjusted based on the embodiments E1 to E3. Considering the thermal stability of electrical resistance, further improvement can be made if the crystalline phases of PVDF are adjusted based on the embodiments E1 and E2, both of which have better performance on the ratio of resistance jump. Regarding the thermal stability of electrical resistance above, please refer to FIG. 4. FIG. 4 shows resistance-temperature curves in accordance with the embodiments E1 to E3, and 300 kGy, 600 kGy and 1000 kGy in the figure corresponds to the embodiment E1, the embodiment E2, and the embodiment E3, respectively. The trip temperature of the embodiment E1 and the embodiment E2 ranges from about 160° C. to 170° C., and the trip temperature of the embodiment E3 ranges from about 140° C. to 150° C. That is, the embodiment E1 and the embodiment E2 trip at about the melting temperature of PVDF, but the embodiment E3 does not. It means that PVDF in the embodiment E3 is degraded to some extent, and such degradation makes the trip temperature of the embodiment E3 lower than the melting temperature of PVDF. In addition, the embodiment E3 exhibits negative coefficient temperature (NTC) behavior after tripping, that is, it shows a declined tendency of electrical resistance in the temperature range from 160° C. to 200° C. In other words, the electrical resistance of the embodiment E3 gradually decreases with gradual elevation of temperature after tripping, and it may cause the cut-off overcurrent to flow again owing to the gradual decrease in electrical resistance.

Subsequently, other electrical characteristics are tested for further verification of the thermal stability and voltage endurance capability, as shown in Table 4 below. It is noted that the comparative embodiments C1 to C3 cannot withstand the applied voltage/current at 60V/20A as described above, and therefore the electrical characteristics of comparative embodiments C1 to C3 in Table 4 are measured under 36V/20A.

TABLE 4

Other electrical characteristics.

| Group | $I-T_{25° C.}$ (A) | $I-T_{125° C.}$ (A) | $I-T_{125° C.}/I-T_{25° C.}$ | $P_{25° C.}$ (W) | $P_{25° C.}$/area (W/mm$^2$) |
|---|---|---|---|---|---|
| E1 | 2.73 | 1.08 | 0.396 | 163.8 | 4.68 |
| E2 | 2.7 | 0.9 | 0.333 | 162 | 4.63 |
| E3 | 2.75 | 0.75 | 0.273 | 165 | 4.71 |
| C1 | 2.6 | 1.48 | 0.569 | 93.6 | 2.67 |
| C2 | 3.05 | 1.51 | 0.495 | 109.8 | 3.14 |
| C3 | 2.97 | 1.21 | 0.407 | 106.92 | 3.05 |

As shown in Table 4, the first row shows items to be tested from left to right.

"$I-T_{25° C.}$" refers to trip current of the over-current protection device under the environmental temperature of 25° C.

"$I-T_{125° C.}$" refers to trip current of the over-current protection device under the environmental temperature of 125° C.

"$I-T_{125° C.}/I-T_{25° C.}$" is used to compare different trip currents under different environmental temperatures, thereby observing the severity of thermal derating that the trip current decreases as the environmental temperature increases. The lower the value of "$I-T_{125° C.}/I-T_{25° C.}$" is, the more severe the thermal derating is, and vice versa.

"$P_{25° C.}$" refers to endurable power of the over-current protection device under the environmental temperature of 25° C.

"$P_{25° C.}$/area" refers to endurable power per unit area of the over-current protection device under the environmental temperature of 25° C.

In Table 4, the embodiments E1 to E3 have $I-T_{125° C.}/I-T_{25° C.}$ ranging from 0.273 to 0.396, and $P_{25° C.}$/area ranging from 4.63 W/mm$^2$ to 4.71 W/mm$^2$; the comparative embodiments C1 to C3 have $I-T_{125° C.}/I-T_{25° C.}$ ranging from 0.407 to 0.569, and $P_{25° C.}$/area ranging from 2.67 W/mm$^2$ to 3.14 W/mm$^2$. In other words, thermal derating in the embodiments E1 to E3 is slightly pronounced but is not much different from that in the comparative embodiments C1 to C3. However, the embodiments E1 to E3 can withstand higher power without burnout and the voltage-endurance value of over-current protection device is enhanced up to 60V. The attention should be drawn to the applied voltage again. In order to measure the electrical characteristics for comparison, the applied voltage to the comparative embodiments C1 to C3 is adjusted to 36V. If the applied voltage to the comparative embodiments C1 to C3 is raised to 60V, the comparative embodiments C1 to C3 are burnout as discussed of cycle life test in Table 3, not to mention the measurement of electrical characteristics. Accordingly, the aforementioned thermal derating in the embodiments E1 to E3 is acceptable due to their high-voltage endurance capability. Under the same high voltage (60V), the comparative embodiments C1 to C3 are burnout, and this situation is much worse than thermal derating. In conclusion, the over-current protection devices 10 of the embodiments E1 to E3 can be made in a thin size (0.22 mm in thickness), and withstand the high applied power ranging from 4.63 W/mm$^2$ to 4.71 W/mm$^2$ without burnout.

The present invention provides a thin-type over-current protection device which can be applied at high temperature and has excellent voltage endurance capability. The over-current protection device can be thinned to 0.2 mm and withstand the applied voltage at 60V without burnout. More specifically, the present invention selects polyvinylidene difluoride (PVDF) as a matrix with high melting point, and further adjusts the proportion among crystalline phases existing in PVDF, by which the over-current protection device may have excellent voltage endurance capability during the operation at high temperature. Also, the over-current protection device may recover back to low electrical resistance after tripping many times under high temperature. In this way, thermal stability and voltage endurance capability of the over-current protection device can be improved without help of additional additives.

The above-described embodiments of the present invention are intended to be illustrative only. Numerous alternative embodiments may be devised by persons skilled in the art without departing from the scope of the following claims.

What is claimed is:

1. An over-current protection device, comprising:
    a first metal layer;
    a second metal layer; and a heat-sensitive layer laminated between the first metal layer and the second metal layer, the heat-sensitive layer exhibiting a positive temperature coefficient (PTC) characteristic and comprising:
  a first polymer consisting of polyvinylidene difluoride (PVDF), wherein PVDF has a plurality of crystalline phases comprising α-PVDF, β-PVDF and γ-PVDF, wherein the total amount of α-PVDF, β-PVDF and γ-PVDF is calculated as 100%, and the amount of γ-PVDF accounts for 33% to 42%; and
  a conductive filler consisting of carbon black and dispersed in the first polymer, thereby forming an electrically conductive path in the heat-sensitive layer.

2. The over-current protection device of claim 1, wherein the amount of β-PVDF accounts for 9% to 21%.

3. The over-current protection device of claim 2, wherein the combined amount of γ-PVDF and β-PVDF accounts for 54% to 62%.

4. The over-current protection device of claim 2, wherein a percentage value by dividing the amount of β-PVDF by the combined amount of α-PVDF and γ-PVDF ranges from 15% to 27%.

5. The over-current protection device of claim 1, wherein the volume of the heat-sensitive layer is calculated as 100%, and the first polymer accounts for 50% to 65% by volume.

6. The over-current protection device of claim 5, wherein the heat-sensitive layer further comprises a second polymer, and the conductive filler is dispersed in the first polymer and the second polymer, wherein the second polymer is a fluoropolymer selected from the group consisting of polytetrafluoroethylene, ethylene-tetrafluoroethylene copolymer, tetrafluoroethylene-hexafluoro-propylene copolymer, perfluoroalkoxy modified tetrafluoroethylenes, poly(chlorotrifluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

7. The over-current protection device of claim 6, wherein the second polymer is polytetrafluoroethylene.

8. The over-current protection device of claim 7, wherein the volume of the heat-sensitive layer is calculated as 100%, and the second polymer accounts for 4% to 5% by volume.

9. The over-current protection device of claim 8, wherein the heat-sensitive layer further comprises a flame retardant selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide, and any combination thereof, wherein the volume of the heat-sensitive layer is calculated as 100%, and the flame retardant accounts for 3.2% by volume.

10. The over-current protection device of claim 1, wherein the over-current protection device has a thickness and a first electrical characteristic, wherein the thickness ranges from 0.2 mm to 0.4 mm, and the first electrical characteristic is a voltage-endurance value ranging from 36V to 60V.

11. The over-current protection device of claim 10, wherein the over-current protection device has a second electrical characteristic, and the second electrical characteristic is a ratio of resistance jump ranging from 1.2 to 2.2.

12. The over-current protection device of claim 11, wherein the over-current protection device has a third electrical characteristic, and the third electrical characteristic is a trip temperature ranging from 160° C. to 170° C.

13. The over-current protection device of claim 1, wherein the over-current protection device has an electrical resistivity ranging from 0.7 Ω·cm to 0.76 Ω·cm.

14. The over-current protection device of claim 1, wherein the over-current protection device has a top-view area ranging from 30 mm$^2$ to 72 mm$^2$, and an endurable power per unit area ranges from 4.6 W/mm$^2$ to 4.75 W/mm$^2$.

* * * * *